US007394041B2

(12) United States Patent
Choi

(10) Patent No.: US 7,394,041 B2
(45) Date of Patent: Jul. 1, 2008

(54) APPARATUS FOR TREATING A WASTE GAS USING PLASMA TORCH

(75) Inventor: Woon Sun Choi, Seosan-si (KR)

(73) Assignee: Global Standard Technology, Co., Ltd., Hwaseong (KR)

( * ) Notice: Subject to any disclaimer, the term of this patent is extended or adjusted under 35 U.S.C. 154(b) by 12 days.

(21) Appl. No.: 11/474,624

(22) Filed: Jun. 26, 2006

(65) Prior Publication Data

US 2007/0284343 A1 Dec. 13, 2007

(30) Foreign Application Priority Data

Jun. 7, 2006 (KR) ...................... 10-2006-0050821

(51) Int. Cl.
*B23K 10/00* (2006.01)

(52) U.S. Cl. ............................ 219/121.36; 219/121.51; 219/121.52; 219/75; 110/250; 110/346; 315/111.21; 422/186.21; 588/900

(58) Field of Classification Search ............ 219/121.36, 219/121.48, 121.51, 121.52, 121.37; 110/246, 110/346, 250, 185, 186, 342; 315/111.51, 315/111.21; 422/186.21; 588/900
See application file for complete search history.

(56) References Cited

U.S. PATENT DOCUMENTS 5,108,718 A 4/1992 Dummersdorf et al.
6,169,265 B1 * 1/2001 Dvoskin et al. ........ 219/121.52
6,173,002 B1 * 1/2001 Robert .......................... 373/9
6,250,236 B1 * 6/2001 Feizollahi ................... 110/346
6,514,469 B1 * 2/2003 Kado et al. ............ 422/186.21
7,216,593 B2 * 5/2007 Capote et al. ............... 110/250
2002/0040889 A1 * 4/2002 Markunas et al. ...... 219/121.36

FOREIGN PATENT DOCUMENTS

FR 2 652 981 4/1991
FR 2 866 414 8/2005
WO 03/095072 11/2003
WO 2006/124688 11/2006

* cited by examiner

*Primary Examiner*—Mark H Paschall
(74) *Attorney, Agent, or Firm*—Ladas & Parry LLP

(57) ABSTRACT

Disclosed is a waste gas treatment apparatus having a waste gas inlet for flowing a waste gas into a main combustion chamber provided in empty space inside a body, and a plasma torch configured to propagate flames against the waste gas flowing through the waste gas inlet. The apparatus comprises a steam injection nozzle configured to eject high temperature steam against the flames emitted through a nozzle of the plasma torch, and a reaction tube, extended longitudinally toward the bottom of the main combustion chamber into a tube shape, configured to perform the chemical reaction between a reaction accelerating compound and the waste gas induced by pressure of the nozzle of the plasma torch.

7 Claims, 3 Drawing Sheets

APPARATUS FOR TREATING A WASTE GAS USING PLASMA TORCH

CLAIM FOR PRIORITY

This application is based on and claims priority to Korean Patent Application No. 10-2006-0050821 filed on Jun. 7, 2006 in the Korean Intellectual Property Office (KIPO), the entire contents of which are hereby incorporated by reference.

BACKGROUND

1. Field of the Invention

The present invention relates to the field of an apparatus for treating a waste gas using a plasma torch, and more particularly to an apparatus for treating a waste gas using a plasma torch, capable of burning at high temperature, which can discharge a harmless byproduct and gas from the waste gas, which is harmful to the human body, by supplying a reactant that can substitute a harmless substance for a harmful substance while burning the noxious PFC gas generated by the manufacturing processes of TFT, LCD, OLED, and others.

2. Description of the Related Art

Environmental contamination, resulting from a harmful waste gas emitted from the industrial facilities following industrialization, has been a significant problem in the world. Thus, multilateral studies on the treatment of the waste gas produced during operation of the industrial facilities have been advanced.

As a part of such multilateral studies, Korean patent No. 10-0176659, which is the title of an apparatus for treating a harmful substance of a waste gas, discloses a waste gas treatment system which treats a harmful substance contained in a waste gas through a chemical vapor deposition (CVD) process and a plasma etching process.

Korean patent No. 10-0529826, which is the title of a method and apparatus for treating wastes by plasma pyrolysis, discloses a waste gas treatment system mounted with a plasma torch for pyrolyzing a harmful waste gas while the harmful waste gas is passing through a furnace.

Korean patent No. 10-558211, which is the title of a power remover in semiconductor post-process using plasma, discloses a waste gas treatment system which can collect a harmful waste gas in a chamber by plasma discharge while the harmful waste gas is passing through the chamber.

Further, Korean patent No. 10-0459315, which is the title of hollow electrodes type plasma torch for waste treatment, discloses a plasma torch which is applicable to a waste gas system.

That is, since a plasma torch is provided on one side of a furnace for waste gas treatment so as to release high temperature combustion heat (4,000~7,000° C.), a more harmless byproduct and gas may be produced by pyrolysis and isolation of the waste gas.

However, the conventional apparatuses have disadvantages that the pyrolysis and isolation of the noxious PFC gas generated from the manufacturing processes of TFT, LCD, OLED, and others, does not be sufficiently performed, and performance of the plasma torch is lowered.

SUMMARY

Accordingly, an object of the present invention is to provide a waste gas treatment apparatus that uses a plasma torch capable of burning at high temperature and can discharge a harmless byproduct and gas from the waste gas, which would otherwise be harmful to the human body, by supplying a reactant that can substitute a harmless substance for a harmful substance while burning the noxious PFC gas generated from the manufacturing processes of TFT, LCD, OLED, and others.

Additional advantages, objects and features of the invention will be set forth in part in the description which follows and in part will become apparent to those having ordinary skill in the art upon examination of the following or may be learned from practice of the invention.

In order to accomplish these objects, there is provided a waste gas treatment apparatus using a plasma torch, a waste gas inlet for flowing waste gas into a main combustion chamber provided in empty space inside a body, and a plasma torch for propagating flames in the waste gas flowing through the waste gas inlet, comprising: a steam injection nozzle configured to inject high temperature steam against flames emitted by a nozzle of the plasma torch; and a reaction tube, extended longitudinally toward the bottom of the main combustion chamber into a tube shape, configured to perform the chemical reaction between a reaction accelerating compound and the waste gas induced by pressure of the nozzle of the plasma torch.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF EXEMPLARY EMBODIMENTS

Figure 1:
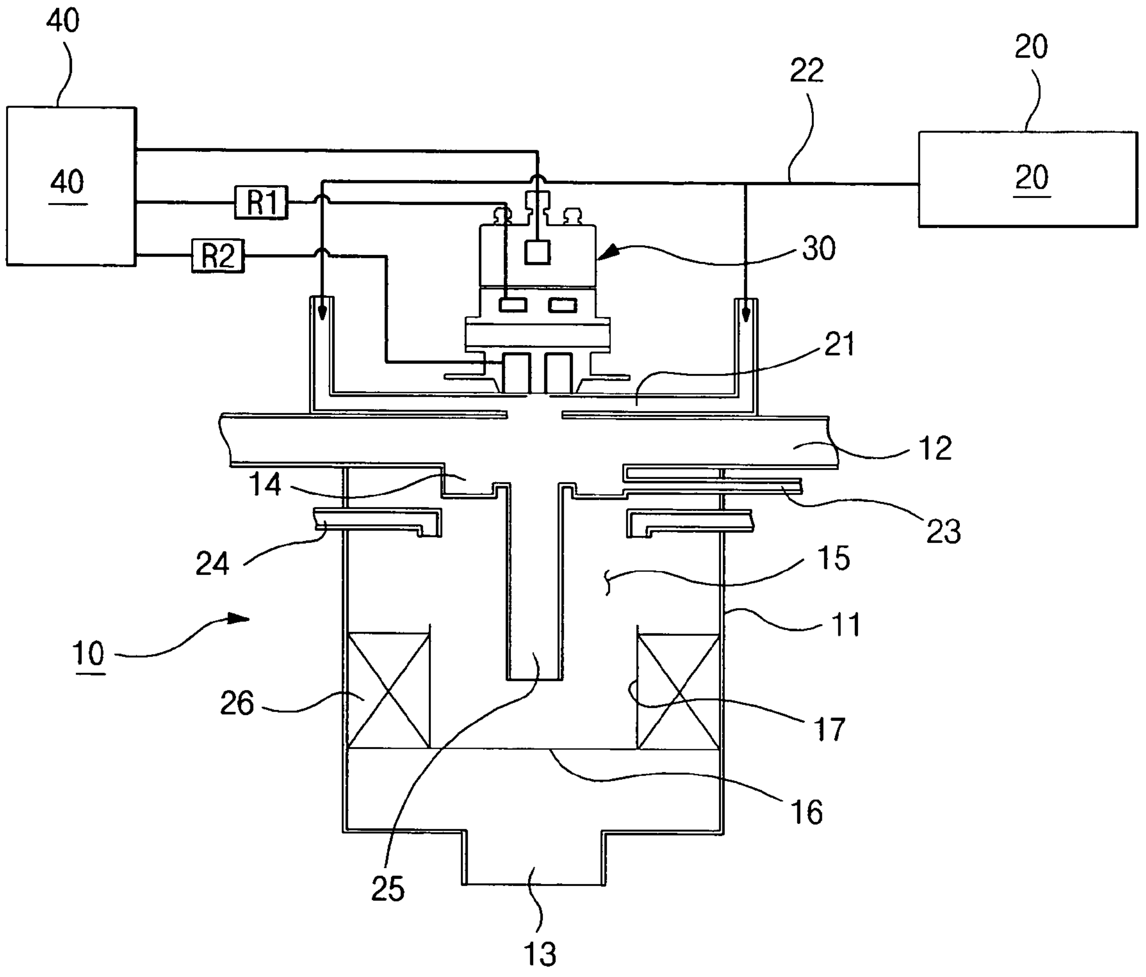
FIG. 1 is a diagram illustrating the constitution of a waste gas treatment apparatus using a plasma torch according to an exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
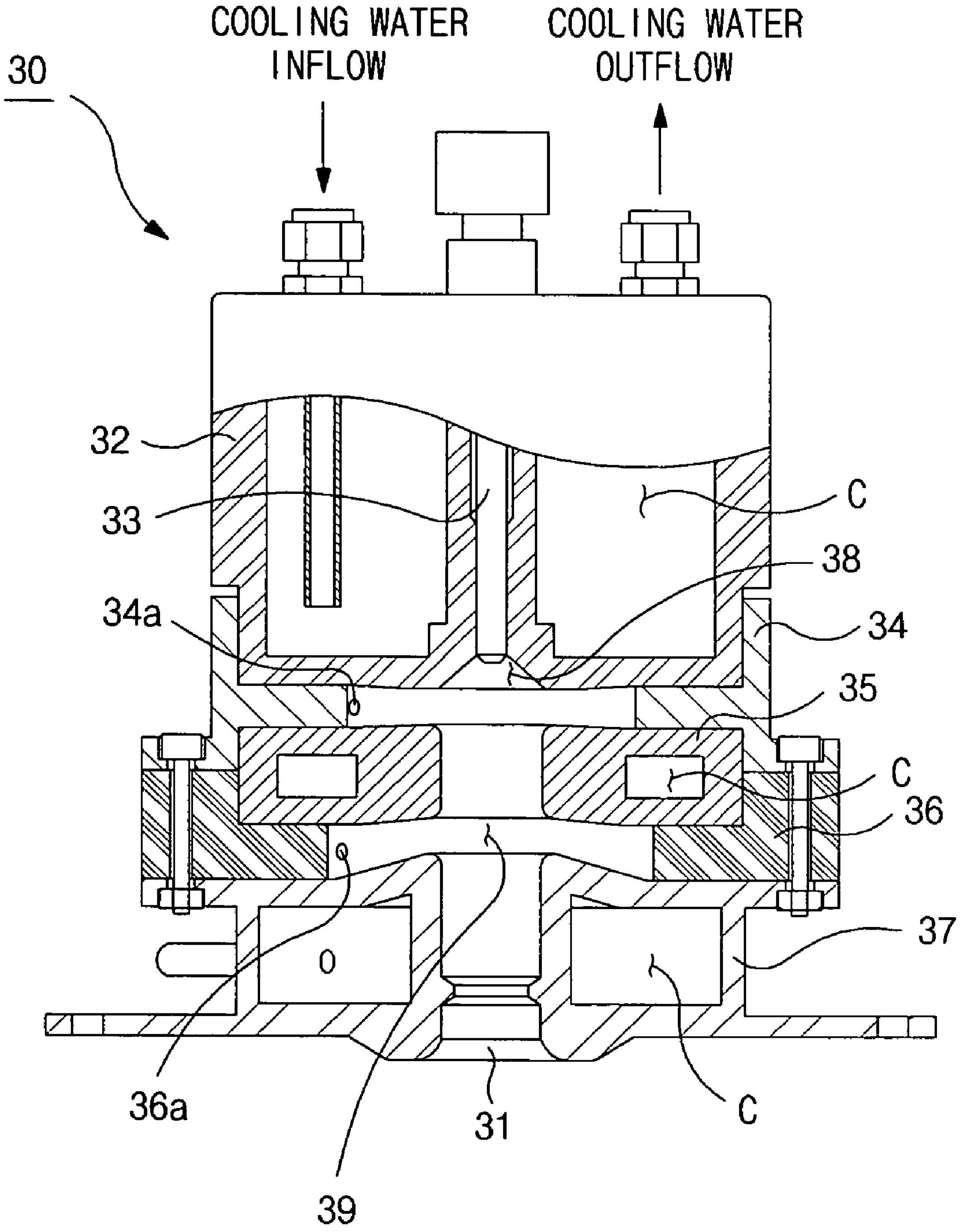
FIG. 2 is a sectional diagram illustrating a plasma torch applied to a waste gas treatment apparatus according to an exemplary embodiment of the present invention.
Figure 3:
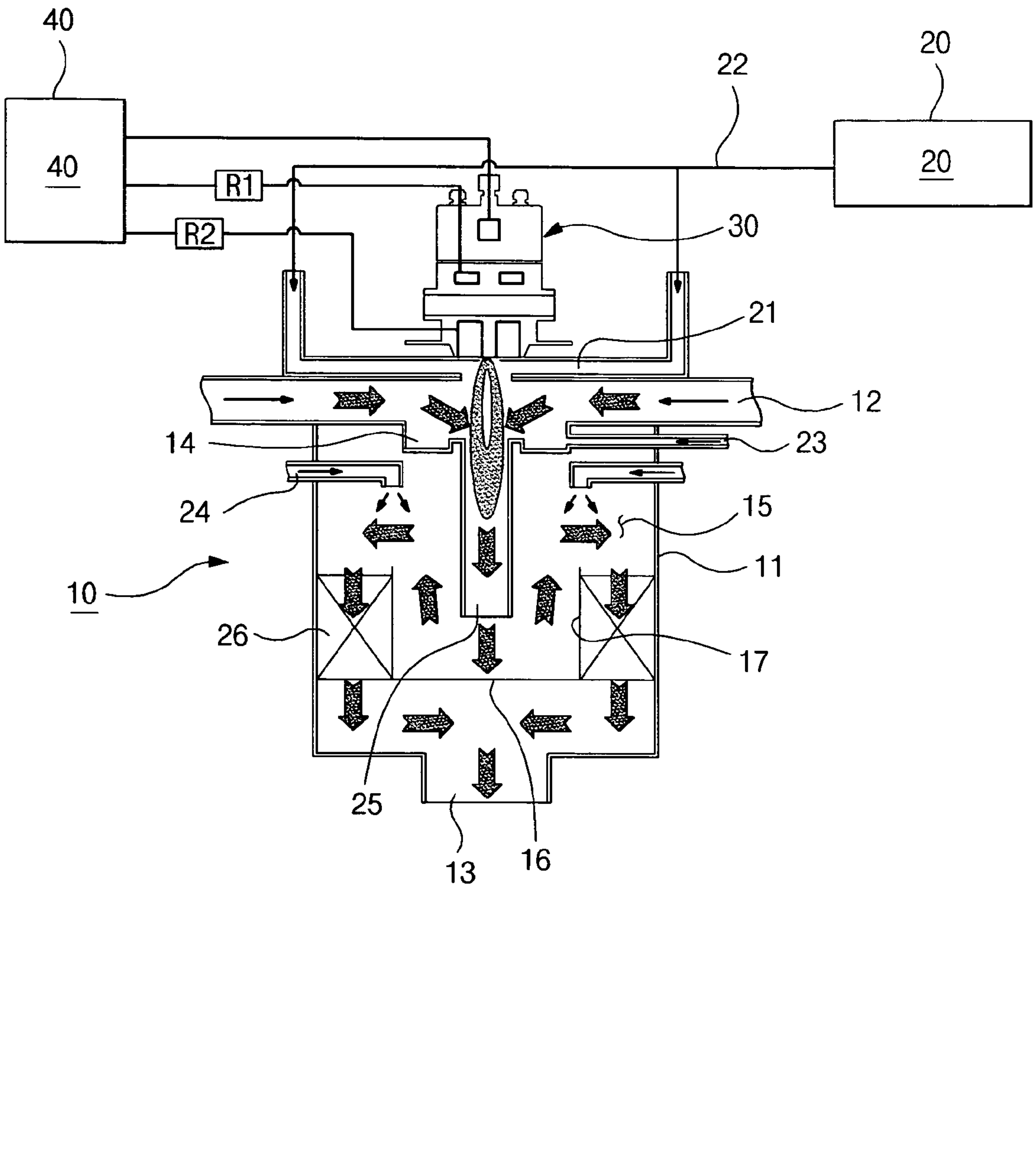
FIG. 3 is an operation state diagram of a waste gas treatment apparatus using a plasma torch according to an exemplary embodiment of the present invention.

FIG. 1 is a diagram illustrating the constitution of a waste gas treatment apparatus using a plasma torch according to an exemplary embodiment of the present invention, FIG. 2 is a sectional diagram illustrating a plasma torch applied to a waste gas treatment apparatus according to an exemplary embodiment of the present invention, and FIG. 3 is an operation state diagram of a waste gas treatment apparatus using a plasma torch according to an exemplary embodiment of the present invention. In the drawings, reference number 10 indicates a waste gas treatment apparatus, and reference number 30 indicates a plasma torch.

In the waste gas treatment apparatus 10, a body 11 is formed into a cylinder shape and provided with a waste gas inlet 12 at one side of the top of the body 11 to flow a waste gas thereinto and a waste gas outlet 13 on the bottom of the body 11 to discharge the waste gas therefrom. Considering that the apparatus 10 is manufactured to treat the noxious PFC gas generated from manufacturing processes of TFT, LCD, OLED, and others, one or more waste gas inlets 12 may be formed on the top of the body 11 so as to treat waste gases generated in several places with only one apparatus. Meanwhile, the waste gas outlet 13 may be configured to collect fluids, which spread widely while passing through the body 11, and then discharge the fluids.

The waste gas inlet 12 is communicated with a main combustion chamber 14 provided on the inside top of the body 11. The main combustion chamber 14 is formed into a circular space. A plasma torch 30 is equipped at the top of the main combustion chamber 14. A nozzle 31 of the plasma torch 30 faces toward the top of the main combustion chamber 14.

Especially, when flames emitted through the nozzle 31 of the plasma torch 30 flows into the main combustion chamber 14, a steam injection nozzle 21 injects steam so as to prevent the reduction (recombination) of substances in a waste gas and induce the substitution of the pyrolyzed waste gas into a hydrogen compound and an oxide. The steam injection nozzle 21 is communicated with a steam generator 20 via a steam supply line 22. The steam generator 20 is formed separately from the body 11 of the waste gas treatment apparatus 10. The steam injection nozzle 21 may be formed in several positions.

Especially, a first reaction accelerating compound inlet 23 is communicated with the sidewall of the main combustion chamber 14. The first reaction accelerating compound inlet 23 supplies a reaction accelerating compound for accelerating oxidation-reduction reaction of a harmful substance, while the waste gases supplied to the main combustion chamber 14 cause chemical reaction and is pyrolyzed through the plasma torch. A liquid phase of sodium hydroxide (NaOH) mixed with water ($H_2O$) is supplied through the first reaction accelerating compound inlet 23. The supplied water protects the wall surface of a reaction tube 25 from the high temperature heat released from the plasma torch as well as induces the generation of a sodium compound and a hydrogen compound by chemical reaction with a substance of the pyrolyzed waste gas.

Meanwhile, the reaction tube 25 is formed into a tube shape at the bottom of the main combustion chamber 14. The reaction tube 25 is longitudinally extended toward an inner space 15 of the body 11. The bottom end of the reaction tube 25 is extended to the middle of a partition 17 that forms the boundary with a filter 26 provided on the inside bottom of the body 11. In other words, as shown in the drawing, the filter 26 is formed in the bottom periphery of the inner space 15 of the body 11 so as to filter a substance produced by pyrolysis and isolation of the waste gas. The partition 17 is provided between the inner periphery of the filter 26 and the reaction tube 25 to prevent the fluid passed through the reaction tube 25 from passing through the filter 26 directly. The reaction tube 25 has a narrower diameter but a longer length than the main combustion chamber, thereby increasing the plasma density and concentrating energy.

A second reaction accelerating compound inlet 24 is formed so as to supply a reaction accelerating compound for inducing chemical reaction one more time, when the waste gas, which has chemically reacted first while passing through the reaction tube 25, runs against the partitions 16, and 17, and then flows upwardly. A gas phase of sodium hydroxide (NaOH) mixed with water ($H_2O$) is supplied through the second reaction accelerating compound inlet 24. The gas phase of water mixed with sodium hydroxide cool down the gas flowing toward the filter 26 and neutralize gas acidity.

As shown in FIG. 2, in the plasma torch 30 applied to the waste gas treatment apparatus 10 according to the present invention, the body 11 is composed of a cathode electrode body 32, an upper insulator 34, an ignition electrode body 35, a lower insulator 36, and an anode electrode body 37, depending on whether an electric current flows or not. A cooling hole C is formed on the inside of the cathode electrode body 32, the ignition electrode body 35, and the anode electrode body 37, thereby lowering the temperature during the discharge.

Meanwhile, in order to generate Arc discharge in each gap between the cathode electrode body 32 and ignition electrode 35, and between the ignition electrode 35 and anode electrode 37, a cathode electrode 33 is assembled so as to stand up longitudinally in the middle of the cathode electrode body 32. Especially, the bottom end of the cathode electrode 33 is exposed toward a first combustion chamber provided on the bottom of the cathode electrode body 32. The first combustion chamber 38 becomes wider downwardly so that the sectional shape thereof looks like a roof. The ignition electrode 35 is assembled on the outside bottom surface of the cathode electrode 32 via the upper insulator 34 as a mediator, while maintaining a predetermined gap. The ignition electrode 35 is not electrically connected to the cathode electrode 32.

The ignition electrode body 35 is made of a metal (copper) like the cathode electrode 32. A penetrating hole having a similar diameter to the bottom diameter of the first combustion chamber 38 is formed in the middle of the ignition electrode body 35. A second combustion chamber 39, which is larger than the size of first combustion chamber 38, is formed on the bottom of the penetrating hole. The diameter of second combustion chamber 39 also becomes wider downwardly so that the sectional shape thereof looks like a roof. The inner periphery of the penetrating hole is an anode electrode that corresponds to the cathode electrode 33 and a terminal for connecting a positive (+) power cable from a power supply 40 is formed at one side of the ignition electrode body 35.

A gas injection nozzle **34*a* provided on the upper insulator 34 ejects a working gas supplied from the outer periphery of the upper insulator 34 toward the inner periphery thereof. In order to cause the working gas to swirl without concentrating in the center of the upper insulator 34, 2~4 number of gas injection nozzles are preferably formed into a helical shape at a predetermined angle. More preferably, 4 gas injection nozzles are formed at an angle interval of 90°. Similarly, in the case where a gas injection nozzle 36*a* is provided on the lower insulator 36, 2~4 number of gas injection nozzles are preferably formed into a helical shape at a predetermined angle so as to cause a gas ejected toward the second combustion chamber 39** to swirl over. More preferably, 4 gas injection nozzles are formed at an angle interval of 90°.

Especially, as shown in FIG. 2, intervals between the middle sectional surfaces of each electrode are similar to each other. However, according to an exemplary embodiment of the present invention, it is desirable that an interval between the middle sectional surfaces of the anode electrode body 37 and ignition electrode 35 is greater than that between the middle sectional surfaces of the cathode electrode body 32 and the ignition electrode body 35, preferably 2~5 times. That is, the first and second combustion chambers 38 and 39, respectively, are placed in each middle part of the ignition electrode body 35 and anode electrode body 37 to which positive power is applied from the power supply, the middle parts being formed to have a smaller sectional surface than the periphery. Therefore, the electric current applied to each terminal can be spontaneously induced in the first and second combustion chambers 38 and 39, respectively, due to the electric property.

The operation state of a waste gas treatment apparatus using a plasma torch according to the present invention will be briefly explained below.

First, using the plasma torch 30 for providing flames burning the waste gas flowing into waste gas treatment apparatus 10, a negative (−) current of a power supply 40 is applied to the cathode electrode 32 and a positive (+) current is applied to the ignition electrode 35 in the plasma torch 30. Thus, the cathode electrode body 32 has negative polarity, while the ignition electrode body 35 has positive polarity. In the first combustion chamber 38, sparks are created by discharging electrons of the cathode electrode 32 into the ignition electrode body 35, and simultaneously, a working gas is supplied through the gas injection nozzle 34*a*. Therefore, flames are generated by discharging and combusting the working gas in the first combustion chamber 38.

Meanwhile, the ignition electrode body 32 has negative polarity by the negative electric current discharged from the cathode electrode 32 to the ignition electrode 35, and thus, sparks are also created in a second combustion chamber 39 provided between the ignition electrode body 35 and the anode electrode body 37. During this, the working gas is also supplied into the second combustion chamber 39 through the gas injection nozzle 36*a* and then is burnt by Arc discharge, so that more active and high temperature flames are generated. The generated flames are emitted to the main combustion chamber 14 of the waste gas treatment apparatus 10 through the nozzle 31 provided on the bottom of the plasma torch 30.

Then, the waste gas generated from the manufacturing processes of TFT, LCD, OLED, and others, flows into the main combustion chamber 14 through the waste gas inlet 12 provided on the top of the body 11 of the waste gas treatment apparatus 10, and is pyrolyzed through combustion. When the waste gas flows into the main combustion chamber 14, the steam generated from the steam generator 20 through the steam injection nozzle 21 is ejected against the flames emitted from the nozzle 31 of the plasma torch 30 through the stem supply pipe 22. As described above, the steam injection nozzle 21 ejects $H_2O$ activated into a steam phase and air in parallel with the flames, so that substitution into a hydrogen compound and an oxide may be accelerated during the pyrolysis of the waste gas in the main combustion chamber 14.

Further, a liquid phase of sodium hydroxide (NaOH) mixed with water ($H_2O$) is supplied to the main combustion chamber 14 through the first reaction accelerating compound inlet 23, so that the fluid produced during pyrolysis of the waste gas may be substituted into a sodium compound and a hydrogen compound.

The compound supplied through the first reaction accelerating compound inlet 23, waste gas and flames are chemically reacted while flowing downwardly through a reaction tube 25. The reaction tube 25 is extended toward the bottom of the main combustion chamber 14.

The partitions 16 and 17 placed on the bottom of and inner periphery of a filter 26 change the flow direction of waste gas, which that passed through the reaction tube 25, into up and outward directions. Here, the sodium hydroxide and water mixture is ejected in gas phase through the second reaction accelerating compound inlet 24, so that the flow direction of fluids is changed from outward flow to downward flow. Furthermore, the high temperature waste gas is cooled and acid waste gas is neutralized.

The waste gas, which flows downward past the second reaction accelerating compound inlet 24, passes through the filter 26. At this time, particular substances are collected in the filter 26. Furthermore, the waste gas, which passed through the filter 26, is discharged through the waste gas outlet 13.

As described above, the waste gas treatment apparatus using the plasma torch, according to the present invention, produces the following effects.

The harmful substances contained in a waste gas are pyrolyzed by the high temperature flames emitted from the plasma torch, and then chemically react with a reaction accelerating compound, which is supplied to a combustion chamber and the inner space thereof, thereby allowing the waste gas to be discharged into a harmless state.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. In a waste gas treatment apparatus having a waste gas inlet for flowing a waste gas into a main combustion chamber provided in empty space inside a body, and a plasma torch configured to propagate flames against the waste gas that is flowed through the waste gas inlet, the improvements comprising:

a steam injection nozzle configured to eject high temperature steam against the flames emitted through a nozzle of the plasma torch;

a reaction tube, extended longitudinally toward the bottom of the main combustion chamber in a tube shape, configured to perform the chemical reaction between a reaction accelerating compound and the waste gas induced by pressure of the nozzle of the plasma torch;

a first reaction accelerating compound inlet configured to supply a reaction accelerating compound to the inside of the main combustion chamber so as to perform the chemical reaction with substances contained in the waste gas;

a second reaction accelerating inlet configured to eject a reaction accelerating compound with water to the side of the reaction tube; and a filter provided on the side at the bottom of the body, wherein the first and second reaction accelerating compound inlets supply sodium hydroxide (NaOH) and water ($H_2O$), and wherein the plasma torch comprises:

a cathode electrode;

a cathode electrode body where the cathode electrode is longitudinally assembled, a first combustion chamber is provided in the middle bottom thereof, and a cooling water channel is provided around the periphery thereof;

an ignition electrode body, placed at a location spaced by a predetermined interval from the first combustion chamber of the cathode electrode body, provided with a second combustion chamber on the middle bottom thereof;

an anode electrode body placed at a location spaced by a predetermined interval from the ignition electrode body;

an upper insulator, provided with a gas injection nozzle for supplying a working gas from the outer periphery to the inner periphery thereof, configured to isolate between the cathode electrode body and the ignition electrode body; and a lower insulator, provided with the gas injection nozzle for supplying the working gas from the outer periphery to the inner periphery thereof, configured to isolate between the ignition electrode and anode electrode.

2. The apparatus of claim 1, wherein a cooling hole C is provided to each inside of the cathode electrode body, ignition electrode body, and anode electrode body, so that the temperature is lowered during electric discharge.

3. The apparatus of claim 2, wherein the middle bottom of the first combustion chamber in the cathode electrode body is formed into a roof shape so as to enable the bottom end of the cathode electrode to be assembled to a recess state.

4. The apparatus of claim 3, wherein the anode electrode body includes a nozzle on the middle top thereof, the mouth of the nozzle being protruded into a mountain shape toward the inside of the second combustion chamber.

5. The apparatus of claim 4, wherein the second combustion chamber is greater than the first combustion chamber.

6. The apparatus of claim 5, wherein gas injection nozzles of the top and lower insulators are formed into a helical shape.

7. The apparatus claim 6, wherein an interval between the middle sectional surfaces of the anode electrode body and ignition electrode body is greater than that between the cathode electrode body and ignition electrode body.

* * * * *